United States Patent Office 3,372,059
Patented Mar. 5, 1968

3,372,059
CHEMICAL REDUCTION PROCESS FOR SILVER, COPPER, OR NICKEL DEPOSITION
Harold H. Roth, Bay City, Mich., assignor to The Dow Chemical Company, Midland, Mich., a corporation of Delaware
No Drawing. Continuation-in-part of application Ser. No. 321,362, Nov. 4, 1963. This application Apr. 24, 1967, Ser. No. 632,910
8 Claims. (Cl. 117—227)

ABSTRACT OF THE DISCLOSURE

This disclosure concerns a method for readily controlling the rate of deposition of an electroconductive film of silver, copper or nickel on a non-conductive surface by chemical reduction of an aqueous plating bath of a water-soluble silver, copper or nickel salt with a reducing agent by adding to such a conventional plating bath a small proportion of a water-soluble resinous polymeric acrylamide, which resinous polymeric acrylamide controls the rate of deposition of the silver, copper or nickel.

Related application

This application is a continuation-in-part of U.S. patent application Ser. No. 321,362 filed Nov. 4, 1963, now abandoned.

Summary of the invention

It has been discovered, in accordance withe the process of this invention, that effective control of the conventional chemical reduction silver, copper or nickel plating processes can be achieved to give silver, copper or nickel coatings of good electrical conductance, whether on glass or other non-conductive surfaces, and particularly transparent coatings, by adding a polymeric acrylamide resin in small amount to a conventional silver, copper or nickel aqueous plating bath, whereby the rate of such metallic deposition is reduced so as to make possible effective control of metal film thickness. Thus, the process of this invention is an improvement of the wet processes of chemical reduction of silver, copper or nickel salts wherein such metal is deposited to form mirrors and similar continuous electroconductive metal films on non-conductive surfaces.

Description of the preferred embodiments

In accordance with the process of this invention, the addition of polymeric acrylamide resins in amounts ranging between 0.04 and 1 weight percent, based on these metallizing baths as used in conventional chemical reduction plating processes, has been found to be effective in controlling the deposition rates of silver, copper or nickel so as to make possible the production of higher quality mirrors, and, particularly, more highly transparent coatings, i.e., having a transparency of at least 5 percent as determined with a No. 732 Lange Colorimeter (Germany), and having good electrical conductance, i.e., as measured by a resistance of at most 10,000 ohms per inch, determined with a Model 772 Weston Analyzer or with a Leeds and Northrup 60-cycle A.C. bridge using point electrodes. The electroconductive copper and nickel films make it possible to electroplate chromium thereupon where the decorative and protective features of a chromium film are desirable.

The process of this invention is applicable to the well-known Brashear, the Rochelle salts and the formaldehyde wet reduction processes when producing silver films or mirrors, whether on glass or other inert non-conductive surfaces such as those of plastic. These methods are summarized in Bureau of Standards Circular No. 389. Of these processes, the formaldehyde method is preferred because of its simplicity, particularly the Narcus modification thereof; H. Narcus, "Metallizing Plastics," 1960, chapter 2. All of these methods produce silver films by the chemical reduction of an ammoniacal silver nitrate solution with a reducing agent, so that the silver will deposit upon a properly prepared surface.

The process of this invention is similarly applicable to the well-konwn wet reduction processes for producing copper films on glass or other inert nonconductive surfaces. These include hydrazine-Rochelle salt reduction procedures, as described in Narcus, ibid; the alpha-trioxymethylene-Rochelle salt procedures of Narcus U.S. Patent 2,454,610, now expired; and the formaldehyde-Rochelle salt procedures described in "Technical Porceedings Annual Convention American Electroplaters' Society," 46, 265–76 (1959).

The process of this invention is likewise applicable to the well-known hypophosphite wet reduction processes for producing nickel films on inert, nonconductive surfaces. These include procedures disclosed in Narcus, ibid.: "Metal Finishing," 52, No. 11: 68–76, and No. 12: 61–68; 53, No. 8: 59–69; and in "American Electroplaters' Society Proceedings," 155, 155–7 (1955).

The polymeric acrylamides useful in the method of this invention are water-soluble resinous homopolymers of acrylamide and their partialy hydrolyzed products wherein up to 50 percent of the carboxamide groups are hydrolyzed to carboxylic acid groups and water-soluble salts of the latter; copolymers of acrylamide with up to about 20 mole percent of a member of the group of methacrylamide, 2-aminoethyl methacrylate hydrochloride, dimethylaminoethyl acrylate, lower alkyl esters of acrylic acid and of methacrylic acid, vinyl chloride, vinylbenzyl trimethylammonium chloride, vinyl acetate, sodium styrene sulfonate, sodium vinyltoluene sulfonate, and vinyl lower alkyl ethers, wherein lower alkyl is inclusive of 1 to 4 carbon alkyl groups; and copolymers of acrylamide with up to about 50 mole percent of acrylic acid or methacrylic acid and water-soluble salts of the latter.

The acrylamide polymers employed in the present invention are all water soluble, i.e. give visually continuous aqueous solutions which are infinitely dilutable with water, and have a low degree of crosslinking. It is critical to employ high molecular weight acrylamide polymers, that is, polymers characterized by a viscosity of at least 4 centipoises (cps.) for a 0.5 percent by weight solution of the polymer in an aqueous 4 percent by weight sodium chloride solution adjusted to a pH of 5 to 6 at a temperature of 25° C., such viscosity being measured with an Ostwald viscosimeter. When the acrylamide polymer contains carboxyl groups corresponding to more than 10 percent hydrolysis, it is essential to determine the viscosity in aqueous 4 percent sodium chloride solution at a pH of 5 to 6 and the term "viscosity" refers to the viscosity of a 0.5 percent by weight solution of polymer determined under the above conditions. With acrylamide polymers containing carboxyl groups corresponding to less than about 10 percent hydrolysis, the viscosity characteristics may be determined on an aqueous 0.5 percent by weight solution of the polymer in distilled water adjusted to a pH of 3 to 3.5 at a temperature of 25° C. In either case, the minimum limitation of 4 cps. applies.

The following examples describe completely representative specific embodiments and the best mode contemplated by the inventor of carrying out the invention. They are not to be considered as limiting the invention other than as defined in the claims.

Example 1

A quantity of 12.5 ml. of aqueous 3 percent Separan AP30 high molecular weight polyacrylamide, ca. 30 percent hydrolyzed to acrylate, as sodium salt, plus 40 ml. of reducing solution (130 ml. aqueous 40 percent formaldehyde/liter water) is added to 100 ml. of silvering solution (60 g. silver nitrate+100 ml. 28 percent ammonium hydroxide/liter water). The article to be silvered is submerged in the mixture and kept under gentle motion at room temperature until properly coated. Table I shows results obtainable on glass slides [surface treated in a stannous chloride sensitizing solution (6 g. $SnCl_2 \cdot 2H_2O$ + 40 ml. conc. HCl/500 ml. water)

before silvering] compared to a control.

TABLE I

| Additive | Time (min.) | Transparency (percent) | Resistance (ohms/inch)* |
|---|---|---|---|
| None | 1 | Opaque | 0.83 |
| 0.3% polymer | 1 | 15 | 60 |
| Do | 2 | 11 | 60 |
| Do | 3 | 12 | 60 |
| Do | 5 | 9 | 45 |
| Do | 10 | 8 | 30 |

*Using point electrodes.

Example 2

The procedure of Example 1 is repeated, substituting 0.06 weight percent of a high molecular weight copolymer of 80 percent acrylamide and 20 percent 2-aminoethyl methacrylate hydrochloride in place of the Separan AP30 polymer.

Table II shows results obtainable on glass slides treated with stannous chloride before silvering.

TABLE II

| Time (min.) | Transparency (percent) | Resistance (ohms/inch) |
|---|---|---|
| 2 | 54 | Infinity [1] |
| 5 | 32 | 800 |
| 10 | 17 | 100 |
| 15 | 9 | 75 |

[1] Off scale.

Example 3

The procedure of Example 1 is repeated, substituting 0.4 weight percent of Separan NP10 high molecular weight acrylamide, ca. 5 percent hydrolyzed to acrylate, as sodium salt, in place of Separan AP30 polymer.

Table III shows results obtainable on glass slides treated with stannous chloride before silvering.

TABLE III

| Time (min.) | Transparency (percent) | Resistance (ohms/inch) |
|---|---|---|
| 3 | 32 | 2,000 |
| 4 | 26 | 800 |
| 5 | 17 | 250 |
| 6 | 15 | 200 |
| 10 | 13 | 150 |

Example 4

Pieces of stannous chloride-treated Zerlon 150 styrene-methylmethacrylate copolymer plastic are silvered according to the procedure of Example 1 using Separan NP10 polymer as the additive. Data obtainable are shown in Table IV, which includes an example of a blank and of an example of the result of adding excess polymer.

TABLE IV

| Additive | Time (min.) | Transparency (percent) | Resistance (ohms/inch) |
|---|---|---|---|
| None | 0.1 | Opaque | About 1. |
| 1.4% polymer | 30 | About 80 | Infinity (off scale). |
| 0.4% polymer | 0.1 | 34 | 200–1,000. |

Example 5

When the procedure of Example 1 is repeated using from 0.04 to 1 percent of the resinous polymers listed above and not previously exemplified as additives to the silvering bath, substantially similar results are obtained.

Example 6

A 2 mm. x 50 mm. x 38 mm. glass slide is cleaned with hot aqueous Tide detergent, rinsed with water and dried.

Step 1.—The so-prepared glass slide is immersed for 2 minutes in a solution consisting of a 100 ml. aliquot of 20% titanium trichloride+50 ml. conc. HCl in 800 ml. water at room temperature, then rinsed with water.

Step 2.—The so-treated glass slide is placed in a 100 ml. aliquot of a coppering solution (14 g. cupric acetate+35 ml. 28% $NH_4OH$ in 700 ml. water) to which 0.05 g. Separan NP10 polymer and 8 ml. of 64% hydrazine in water are first added, the resulting plating bath mixture being kept at 60° C. After 3 minutes, no coating is visible. After 50 minutes, a copper-colored coating having a resistance of 30 ohm/in. is deposited. Following Table V compares results obtained with those of a control.

TABLE V

| Additive | Time (min.) | Wt. Cu Plate, g. | Resistance, ohm/in. |
|---|---|---|---|
| None | 3 | 0.009 | 0.7 |
| Ca. 0.04% polymer | 50 | 0.0057 | 30 |

Example 7

A slide of Marbon Cycolac EP3510 acrylonitrile-butadiene-styrene terpolymer, 2" x 1.75" x 0.1", is cleaned with hot aqueous Tide detergent, rinsed with water and dried. The plastic slide is pretreated just prior to coppering for (1) 2 minutes in a solution consisting of 100 ml. conc. $H_2SO$ + 15 g. potassium dichromate + 50 ml. water at 60° C., rinsed in cold water, then (2) treated for 2 minutes in a solution consisting of 2% titanium trichloride + 2% conc. HCl in water at room temperature, rinsed, then (3) treated for 5 minutes in a solution consisting of 0.05% palladium chloride + 1% conc. HCl in water at room temperature, rinsed, then (4) placed in a 100 ml. aliquot of the coppering solution of Example 6 also containing 0.05 g. Separan NP10 polymer and 8 ml. of 64% hydrazine in water while the plating bath solution is kept at 60° C. After 5 minutes, no visible coating is apparent. After 30 minutes, a copper-colored coating is deposited. Following Table VI compares results obtained with those of a control.

TABLE VI

| Additive | Time (min.) | Wt. Cu Plate, g. | Risistance, ohm. in. |
|---|---|---|---|
| None | 5 | 0.0928 | 1.2 |
| Ca. 0.04% polymer | 30 | 0.0353 | 2.0 |

Example 8

A nickeling solution is prepared consisting of a 120 ml. aliquot of a solution of 35 g. nickel sulfate + 10 g. sodium citrate + 15 g. sodium hypophosphite + 20 g. $MgSO_4$ in 1,000 ml. water at 80° C. Plastic slides as in Example 7 are pretreated following the procedure of Example 7 above, and not allowed to dry, then immersed in the nickeling solution under the conditions indicated below and with the following results:

| G. Separan NP10 Polymer Added | Time, min. | Weight of Ni Plate (g.) | Electrical Resistance, ohm/in. |
|---|---|---|---|
| None | 10 | 0.1100 | 1.5 |
| 0.25 | 10 | 0.0570 | 3.2 |

The advantageous results obtainable in the practice of this invention with the formaldehyde wet process of silvering with chemically reductive silver salt plating baths are equally obtainable with the Brashear process and the Rochelle salt process of silvering, and with the chemically reductive copper and nickel salt plating baths conventionally used.

The improved processes of this invention thus make possible the preparation of better quality opaque and transparent silver, copper and nickel films. Transparent silver-coated plastic electrodes are particularly useful for flexible electroluminescent lamps.

What is claimed is:

1. In a method for depositing an electroconductive film of silver, copper or nickel on a non-conductive surface by chemical reduction of an aqueous plating bath of a water-soluble silver, copper or nickel salt with a reducing agent, the improvement which comprises adding from 0.04 to 1 weight percent, plating bath basis, of a water-soluble resinous polymeric acrylamide of the group consisting of (1) homopolymers of acrylamide, partially hydrolyzed products thereof wherein up to 50 percent of the carboxamide groups are hydrolyzed to carboxylic acid groups and water-soluble salts of the latter; (2) copolymers of acrylamide with up to about 20 mole percent of at least one comonomer of the group consisting of methacrylamide, 2-aminoethyl methacrylate hydrochloride, dimethylaminoethyl acrylate, lower alkyl esters of acrylic acid, lower alkyl esters of methacrylic acid, vinyl acetate, vinyl chloride, vinylbenzyl trimethylammonium chloride, sodium styrene sulfonate, sodium vinyltoluene sulfonate and vinyl lower alkyl ethers, wherein lower alkyl designates from 1 to 4 carbon alkyl groups; and (3) copolymers of acrylamide with up to about 50 mole percent of a member of the group consisting of acrylic acid and methacrylic acid and their water-soluble salts; said resinous polymeric acrylamides having a minimum viscosity of 4 centipoises, whereby the rate of silver, copper or nickel deposition is decreased and thereby is readily controlled.

2. Method of claim 1 wherein the plating bath is an aqueous ammoniacal silver nitrate solution containing formaldehyde as the chemical reductant.

3. Method of claim 2 wherein a transparent silver film having a transparency of at least 5 percent and an electrical resistance below 10,000 ohms per inch is applied.

4. Method of claim 2 wherein the polymeric acrylamide is one having substantially 30 percent of its carboxamide groups hydrolyzed to carboxylic acid groups, which latter are in the sodium salt form.

5. Method of claim 1 wherein the plating bath is an aqueous ammoniacal cupric sulfate solution containing hydrazine as the chemical reductant.

6. Method of claim 5 wherein the polymeric acrylamide is one having substantially 5 percent of its carboxamide groups hydrolyzed to carboxylic acid groups, which latter are in the sodium salt form.

7. Method of claim 1 wherein the plating bath is an aqueous nickel sulfate solution containing sodium hypophosphite as the chemical reductant.

8. Method of claim 7 wherein the polymeric acrylamide is one having substantially 5 percent of its carboxamide groups hydrolyzed to carboxylic acid groups, which latter are in the sodium salt form.

References Cited

UNITED STATES PATENTS 2,690,401  9/1954  Gutzeit _____ 117—130 X
2,702,253  2/1955  Bergstrom _____ 117—130

WILLIAM L. JARVIS, *Primary Examiner.*